United States Patent [19]

Pollard et al.

[11] Patent Number: 4,750,440
[45] Date of Patent: Jun. 14, 1988

[54] HOE-OPENER ASSEMBLY

[75] Inventors: Lorne R. Pollard, Naperville; Robert J. Egging, Montgomery; Walter K. Krahenbuhl, Woodridge, all of Ill.

[73] Assignee: J. I. Case Company, Racine, Wis.

[21] Appl. No.: 923,484

[22] Filed: Oct. 27, 1986

[51] Int. Cl.$^4$ ............................................. A01C 7/08
[52] U.S. Cl. ......................................... 111/62; 111/85; 172/624.5; 172/310
[58] Field of Search ................ 111/62, 85, 86, 89, 111/80, 52, 84; 172/624.5, 310, 264, 265, 266, 705, 709, 672, 419

[56] References Cited

U.S. PATENT DOCUMENTS

| | | | |
|---|---|---|---|
| 1,602,529 | 10/1926 | Harris | 172/265 |
| 2,685,384 | 8/1954 | Tanke | 111/52 |
| 3,117,541 | 1/1964 | Todd | 111/62 |
| 3,568,613 | 3/1971 | Lange | 172/672 |
| 3,830,311 | 8/1974 | Bryson | 172/624.5 |
| 3,921,726 | 11/1975 | Connor | 172/624.5 |
| 4,126,190 | 11/1978 | Wylie | 172/624.5 |
| 4,417,530 | 11/1983 | Kopecky | 111/86 |
| 4,425,857 | 1/1984 | Lienemann | 111/52 |
| 4,461,355 | 7/1984 | Peterson | 172/624.5 |
| 4,506,609 | 3/1985 | Fuss | 111/85 |
| 4,638,748 | 1/1987 | Kopecky | 111/86 |
| 4,660,651 | 4/1987 | Pfenninger | 111/85 |

Primary Examiner—Richard J. Johnson
Attorney, Agent, or Firm—Dressler, Goldsmith, Shore, Sutker & Milnamow, Ltd.

[57] ABSTRACT

A hoe-opener assembly having a "float" feature is disclosed. The present invention ties operation of several hoe openers to a common framework so that uniform depth control can be maintained. The hoe-opener assembly of the present invention is drawn behind an agricultural implement having a tool bar, and comprises a vertically movable framework. A frame lift-and-lower arrangement is provided for adjusting the spacing of the framework relative to the ground. The hoe-opener assembly includes a plurality of spring-biased hoe openers, each pivotally carried for limited pivotal movement by the framework at spaced intervals along the length thereof. A biasing-spring arrangement in operative association with each hoe-opener is provided whereby each hoe opener is substantially fixed against independent movement, relative to the framework.

6 Claims, 3 Drawing Sheets

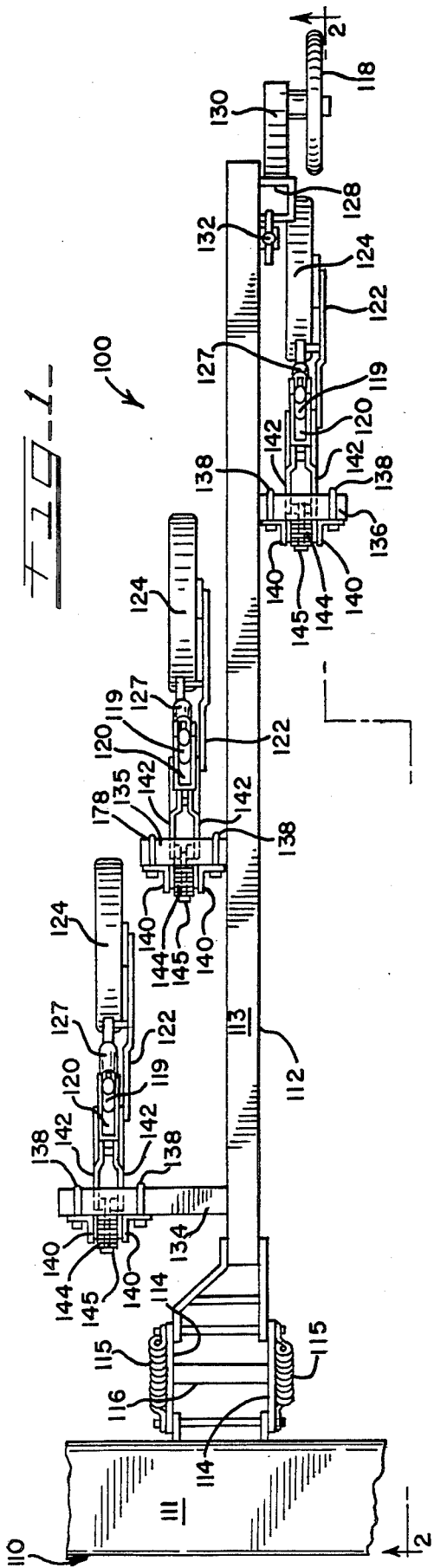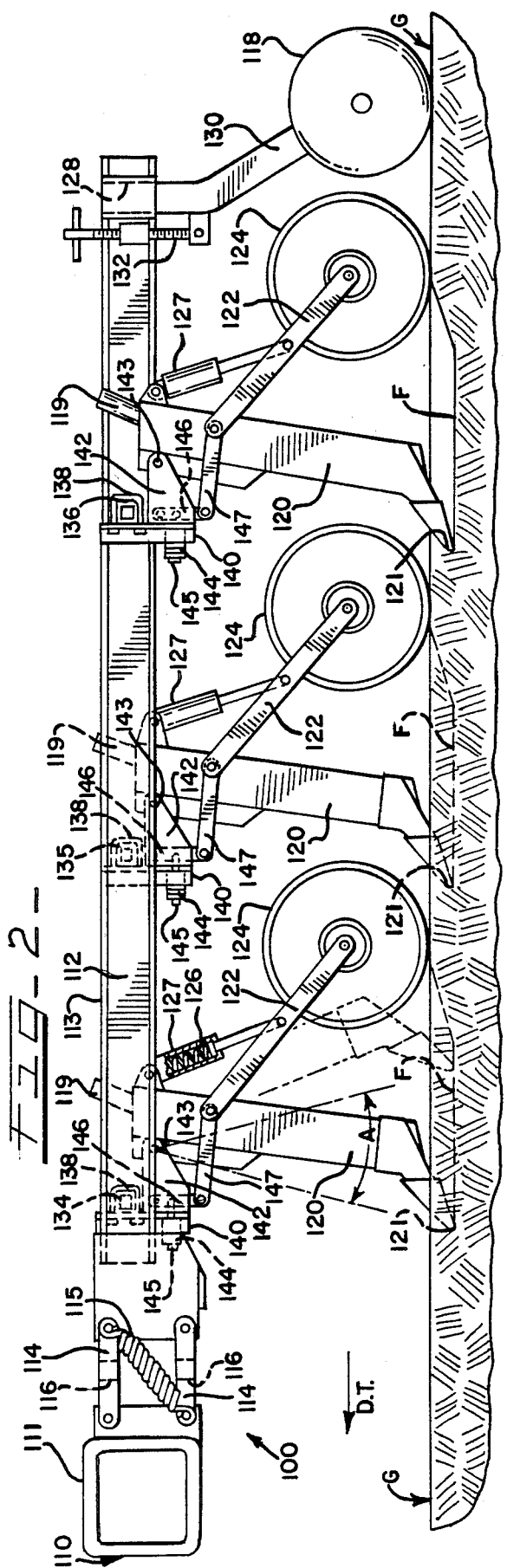

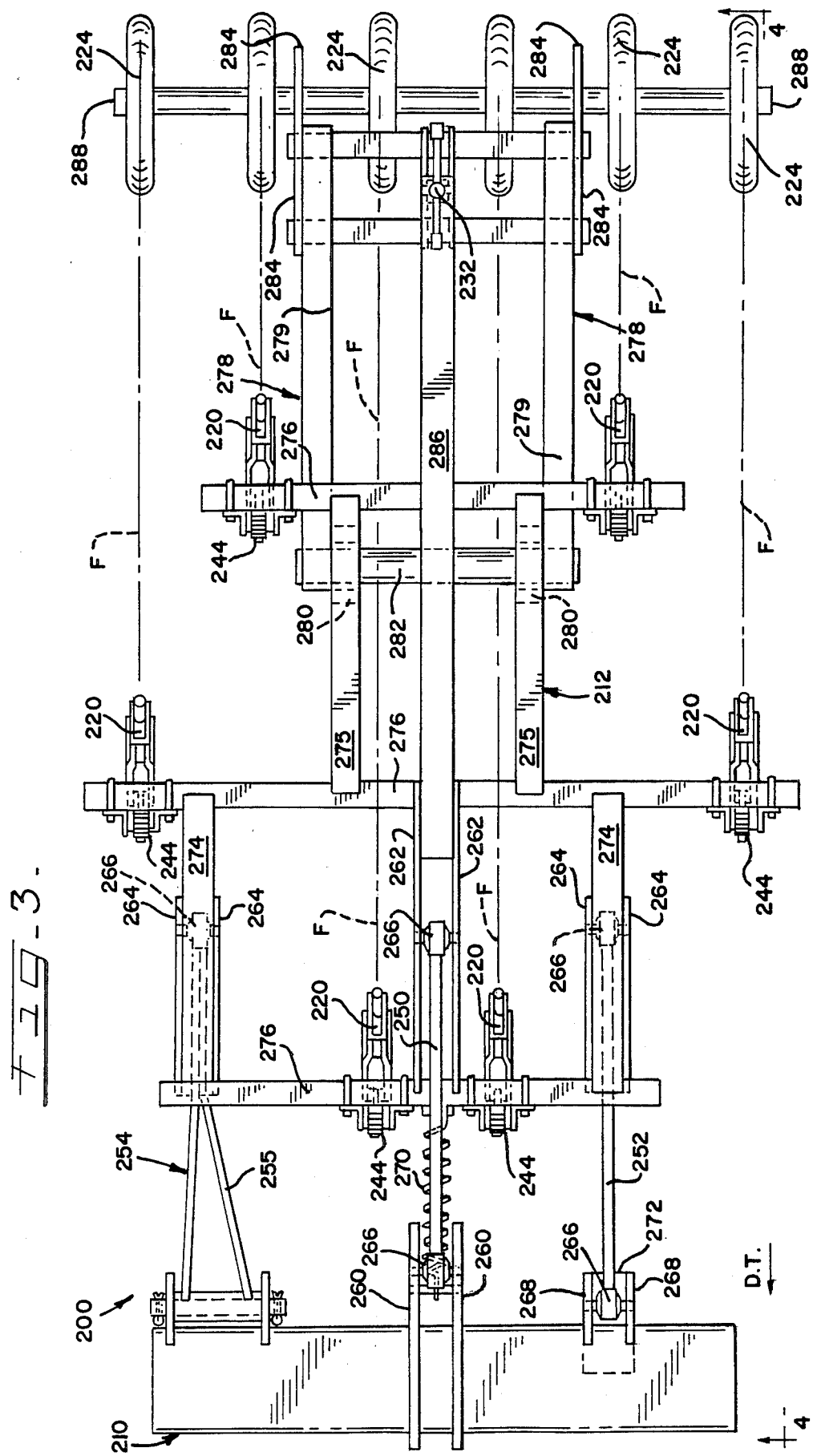

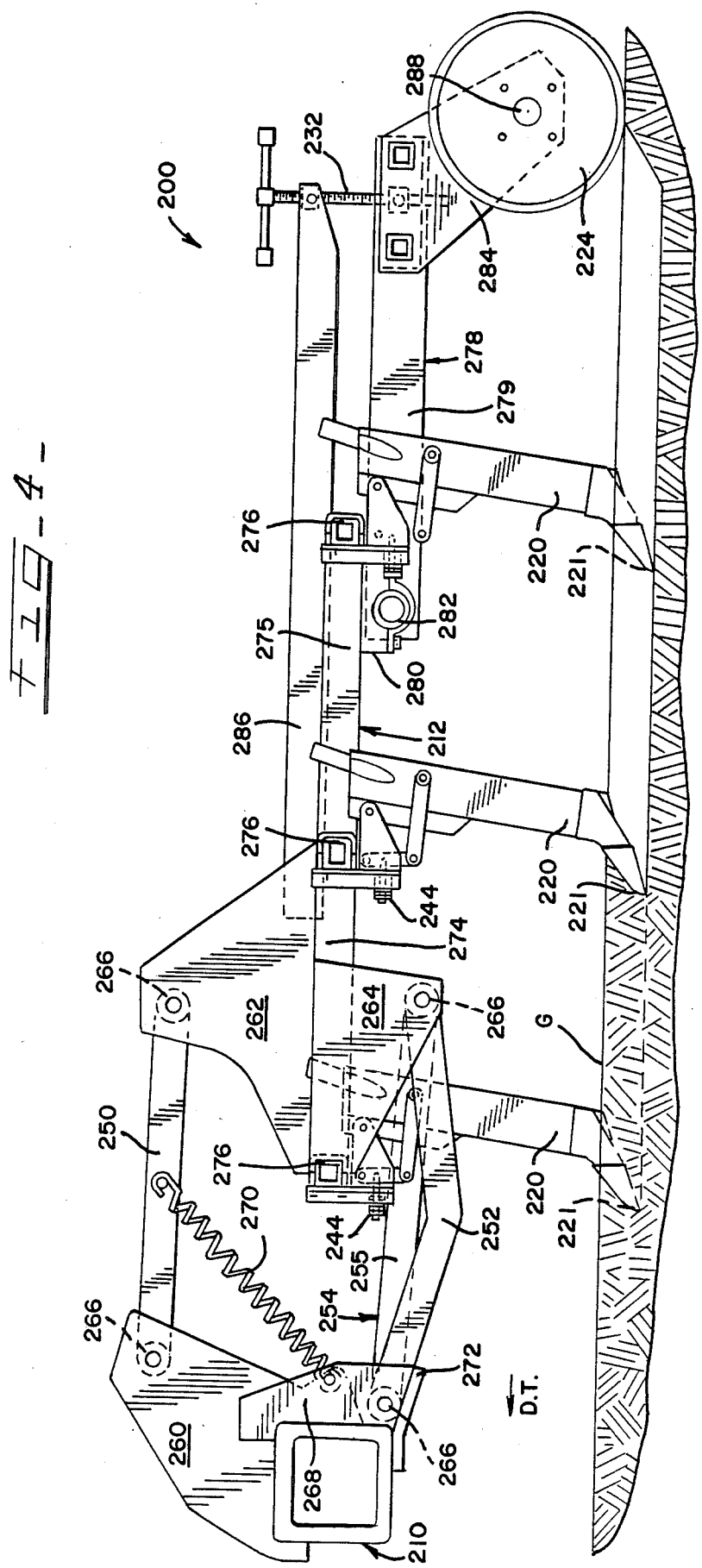

HOE-OPENER ASSEMBLY

TECHNICAL FIELD OF THE INVENTION

The present invention relates generally to the field of agricultural equipment, and more particularly is directed to a soil-opener assembly which utilizes a plurality of "hoe" type soil openers to form in the soil a corresponding plurality of spaced-apart furrows.

BACKGROUND OF THE INVENTION

On a number of conventional soil-opener agricultural implements it is desirable to mount a plurality of a particular type of soil opener, e.g. a plurality of "hoe" type openers, in a spaced-apart manner on movable structure such as a framework. The framework generally extends rearwardly of a tool bar, which may be mounted on wheels. In particular, one conventional type of tool bar can be hitched behind a tractor or other suitably wheeled farm implement, and the framework-mounted hoe openers accordingly utilized to form spaced-apart furrows in the soil.

The use of hoe opener-equipped farm implements has become popular of late, particularly in agricultural areas where it is desirable to implant relatively small-size grain or seed into the soil. The soil of such agricultural areas may typically receive less than a desired amount of rainfall.

Generally, the plural hoe openers are mounted on the framework, in a well-defined spaced-apart manner relative to each other, so that a corresponding plurality of parallel-spaced furrows are formed as the wheeled implement moves the tool bar relative to the ground. Conventionally, each hoe opener is caused to be urged into the ground by structure on the framework so that each one of the plural hoe openers forms a corresponding furrow for seeding, fertilizing, or other desired soil-working purposes. On some of the commercially available hoe opener-equipped farm equipment, particularly that farm equipment having relatively wide frame widths (such as frames having widths of 10 feet or more), uniform soil penetration of the several hoe openers is desirable, yet often unattainable.

For example, in one commercial hoe-opener assembly having several hoe openers that are rigidly fixed to the framework, the hoe openers tend to cause the framework to operate as a unit, so that when one hoe opener meets an obstruction in the soil such as packed, hard or clay-like soil or the like not only the obstructed hoe opener but typically the entire framework is raised relative to the ground to enable the obstructed hoe opener to clear the obstruction. The obstructed hoe opener, along with many of the other hoe openers mounted on the framework, thus temporarily cease forming furrows of uniform and desired depth.

Yet in another commercial type of hoe-opener assembly, the several hoe openers are operatively connected to the framework by a corresponding number of mechanisms which permit each hoe opener not only to operate individually of the other hoe openers but which tend to provide each hoe opener with substantial freedom of movement, so as to avoid being damaged when met with an obstruction. For example, some such mechanisms permit an obstructed hoe opener to pivot (i.e. "trip") rearwardly by up to as much as 75 degrees or more, such pivotal movement often resulting in the toe of the thus-obstructed opener following the surface of the obstruction until returning to its preselected furrow-forming soil-depth position. Although such "trip" mechanisms are effective for minimizing damage to individual, obstructed hoe openers in rocky soil, unfortunately these types of mechanisms also permit the hoe opener to move upwardly out of clay-like, packed or hard soil.

Moreover, it has been observed that (1) uniformity of furrow formation and (2) uniformity of seed depth are two considerations which result in efficient and uniform seedling emergence and root growth, all desirable. These seed-deposition and seedling-growth considerations, furthermore, have been observed to directly affect crop yields. Specifically, selectively controlling these considerations has been found to result in crop yields that are significantly better than average.

Such crop yields are achievable utilizing the hoe-opener assembly of the present invention. In conventional assemblies, the ground force (or ground forces) acting upon the obstructed hoe opener tend to interrupt the desired furrow-forming action of the other hoe openers, to various degrees, as mentioned above. The presence and frequency of field obstructions thus tends to oppose the desired, uniform, soil penetration of conventional hoe-opener assemblies. Such a result may lead to less than average crop yields.

Currently in demand is a hoe-opener assembly, having several hoe openers mounted thereon and being so constructed as to enable its plural openers to form substantially all of a corresponding plurality of spaced-apart furrows of a desired, substantially uniform depth whenever a hoe opener is met by hard or clay-like soil, yet the entire assembly is free to react to avoid damage to a hoe opener that is met by bedrock or a like obstruction.

SUMMARY OF THE INVENTION

In the present hoe-opener assembly, a plurality of hoe openers are operatively coupled to, preferably adjustably mounted onto, a framework. The framework, in turn, is operatively connected to and rearwardly disposed behind an elongated tool bar.

The tool bar is spaced substantially uniformly above the ground, is operatively connected to a tractor or other suitably wheeled farm implement, is disposed transverse to the direction of movement of the implement, and is designed to be moved across a field by the tractor.

The framework drawn by the tool bar is initially spaced a desired distance above the ground, and this distance can be adjusted to selectively control the depth of hoe-opener soil penetration and to otherwise accommodate field unevenness, for allowing the plural hoe openers to form a corresponding plurality of spaced-apart furrows of uniform depth in the soil, as the framework is moved across the field in the manner described above.

The framework is articulated. That is, the framework is connected to and vertically movable relative to the tool bar at the connection where the framework and tool bar are joined together, thereby providing the present hoe-opener arrangement with a desirable "articulation" feature, more specifically an "elevator" feature. That is, the present invention includes structure allowing the framework to be raised and lowered relative to the ground for avoiding hoe-opener damage and for continuing desired furrow formation, respectively. Furthermore, that amount of vertical displacement— through which the framework is movable relative to the ground—is readily selectable, as will be described in greater detail below.

The mass of the framework is greater, preferably significantly greater, than the mass of an individual hoe opener. Yet, because the selection of a hoe opener-to-framework weight ratio is a matter of design choice, a relatively wide range of ratios can be made available utilizing standard materials of construction.

As mentioned above, any hoe opener, when utilized to form a furrow, may meet with an obstruction that forces the thus-obstructed hoe opener out of the ground. Because of the design-choice related nature of the opener-to-framework weight ratio, however, the likelihood of the obstruction forcing the opener out of the ground can readily be predetermined employing conventional inertia-based design considerations. The result is that vertical movement of any one of the plural hoe openers, relative to vertical movement of the remainder of the hoe openers, can be predetermined whereby the hoe-opener assembly that is fabricated in accordance with the principles of the present invention is stabilized and modulated by the inertia of the overall assembly. That is, the present hoe-opener assembly can readily be so fabricated as to achieve the type of uniform depth control that is desired.

Briefly, the present hoe-opener assembly comprises a framework extending rearwardly of the tool bar, linkage means connecting the framework to the tool bar, a plurality of hoe openers pivotally mounted on the framework in spaced-apart relation to each other for forming a corresponding plurality of spaced-apart furrows in the soil, biasing-spring means associated with each hoe opener and limiting substantial pivotal movement of its associated opener relative to the framework, at least one ground-contacting wheel operatively connected to the framework for enabling the framework to be wheeled across the ground, and a jackscrew or like device operatively connected to the framework for adjusting the spacing of the framework above the ground.

The linkage means, pivotally joined to the tool bar and to the framework, permits the framework portion of the present assembly to move upwardly (i.e. "float") to a "raised" position to avoid damage to an individual hoe opener meeting bedrock or a like obstruction. The linkage means includes its own biasing-spring means to bias the framework into its normal furrow-forming position after the assembly has passed the obstruction.

The plural hoe openers are pivotally mounted onto the framework as follows. Each one of the plural hoe openers includes a pin or like means for pivotally connecting it to the framework, and a biasing-spring means so configured as to oppose substantial pivotal movement of its associated hoe opener relative to the framework. To achieve such a result, each one of the plural hoe openers is substantially rigidly fixed against independent movement relative to the framework, to enable the hoe-opener assembly to function as a unit to form the plurality of spaced-apart furrows at substantially the depth desired in the soil as will be described in greater detail below. Briefly, where a conventional hoe opener is allowed to pivot up to about 75 degrees or more relative to its associated structure, the rigidly mounted hoe opener of the present assembly are limited to no more than about 30 degrees of pivotal movement relative to the framework.

The framework can be selectably spaced a desired distance above the ground by an implement operator as follows. Briefly, adjustment of the jackscrew to raise or lower the framework relative to the ground allows the operator to select a desired furrow depth. While the limited-pivotal-movement feature, mentioned above, tends to promote furrow formation in hard or clay-like soil (where conventional hoe openers might not form plural furrows of substantially uniform depth), another feature of the present hoe-opener assembly, described in greater detail below, generally causes the plural hoe openers to be urged a substantially uniform depth into the soil, generally regardless of whether field elevational variations are present or not. This latter feature, in turn, enables the operator to utilize the present hoe-opener arrangement to form a corresponding plurality of furrows of desired, uniform depth. Such furrows are generally equidistant, i.e. any one furrow being spaced substantially equally from its two nearest neighbors. Being able to control furrow depth in this manner is herein referred to as "depth control."

One of the illustrated embodiments of the present invention utilizes an elongated stabilizer bar as its framework element. The stabilizer bar extends behind, and is operatively connected to, the tool bar. Typically, a spaced-apart plurality of framework elements are thus mounted on the tool bar.

This embodiment further includes a ground-contacting gauge wheel rotatably carried by the elongated stabilizer bar in distal relation to the tool bar. The plural hoe openers are each pivotally carried by the stabilizer bar at spaced-apart intervals along the length thereof. Further, as mentioned above, each hoe opener is provided with a respective spring-loaded mechanism which maintains the associated opener in its substantially vertical orientation relative to the substantially horizontally disposed stabilizer bar. That is, each respective one of the plural hoe openers is maintained in a substantially rigid, vertical orientation relative to the framework under normal furrow-forming conditions. Yet such a manner of affixing hoe openers to a framework is fundamentally different from the above-mentioned substantially rigidly-fixed conventional hoe-opener assemblies mentioned above, the difference being briefly described immediately below.

While the substantially rigidly-fixed conventional hoe-opener assemblies mentioned above do not make provision for independent hoe-opener pivotal movement relative to hoe-opener mounting structure, each hoe opener of the present assembly, for example, upon encountering an obstruction is independently able to pivot in an arcuate manner relative to the stabilizer bar to a limited degree. Moreover, the physical characteristics of the biasing-spring means of the present assembly can be preselected to provide substantial, minimal, or intermediate resistance to pivotal movement, whichever is desired.

The second illustrated embodiment utilizes a horizontally-disposed latticed structure as its framework element. The lattice is movably connected to a tool bar substantially of the type described above, and is disposed rearwardly therebehind.

Briefly, the second embodiment of the present hoe-opener assembly comprises a framework in the form of a lattice extending rearwardly of the tool bar, linkage means connecting the lattice to the tool bar, a plurality of hoe openers mounted on the lattice in spaced-apart relation to each other for forming a corresponding plurality of spaced-apart furrows in the soil, biasing-spring means associated with each hoe opener and limiting substantial pivotal movement of its associated opener relative to the lattice, a corresponding plurality of ground-contacting wheels operatively connected to the lattice for enabling the lattice to be wheeled across the ground, and a jackscrew or like device operatively connected to the lattice for adjusting the spacing of the lattice above the ground. The linkage means of the second embodiment is pivotally joined to the tool bar and the lattice to permit the lattice portion of the second embodiment to "float" substantially as described above in connection with the first embodiment. Also, the method of pivotally connecting each one of the plural hoe openers to the lattice is substantially as described above in connection with the first embodiment.

As mentioned above, the jackscrew can be adjusted to raise or lower the lattice relative to the ground as desired. In the second embodiment, the plurality of ground-contacting wheels, mounted on the lattice in distal relation to the tool bar, advantageously function as press wheels for closing each corresponding one of the plural furrows formed by an associated hoe opener. The plural (i.e. "gang of") press wheels, therefore, collectively function as a gauge wheel; and the adjustable nature of the jackscrew allows the agricultural-implement operator to control furrow depth substantially in the manner described above in connection with the first embodiment. That is, the operator can initially so adjust the jackscrew as to cause the plural hoe openers to substantially uniformly penetrate the soil to a desired depth.

This feature of the second embodiment is particularly advantageous because the press wheels, generally always in contact with the ground, cause that portion of the lattice to which they are attached to be relatively uneffected by any field unevenness that may be present as the hoe-opener assembly is moved across the field. One advantage of such a feature is that in areas such as where field unevenness is present—i.e. where conventional, wide framework structure often cannot provide furrows of uniform depth—the hoe-opener assembly of the present invention, when operatively connected to the above-described press wheel-equipped lattice, can readily provide plural, substantially equidistant and parallel, furrows of desired, substantially uniform depth.

Numerous other features and advantages of the present invention will become readily apparent upon reviewing the following detailed description, accompanying drawings, and appended claims.

BRIEF DESCRIPTION OF THE DRAWINGS

FIG. 1 is a top plan view of a first embodiment of a hoe-opener assembly embodying the principles of the presen invention;

FIG. 2 is a side elevational view taken substantially from the plane 2—2 in FIG. 1;

FIG. 3 is a top plan view of a second embodiment of the hoe-opener assembly of the present invention; and FIG. 4 is a side elevational view taken substantially from the plane 4—4 in FIG. 3.

Although like reference numerals are herein utilized to refer to like component parts or elements throughout the drawings, similar or substantially identical mechanical components or elements, as between the two illustrated embodiments, are identified by three-digit numerals having the same last two digits. That is, like components or elements identified by reference numerals of the 100-series in FIGS. 1 and 2 are identified by reference numerals of the 200-series in FIGS. 3 and 4.

DETAILED DESCRIPTION OF PREFERRED EMBODIMENTS

While the present invention is susceptible to embodiment in various forms, there is shown in the drawings and hereinafter described in detail two presently preferred embodiments of the invention, with the understanding that the present disclosure is to be considered as an exemplification of the invention without limitation to the specific embodiments illustrated.

Referring initially to FIG. 1, a first embodiment of the present hoe-opener assembly 100 is shown mounted on an agricultural implement tool bar 110. As will be recognized by those familiar with the agricultural-implement art, a tool bar such as illustrated tool bar 110 is typically part of a tractor-drawn agricultural-implement apparatus, which may be relatively large in size and complex in overall operation. The tool bar on such machinery typically extends rearwardly from the machinery, is often elongated, and is typically disposed transverse to the direction of movement of the machinery. The hoe-opener assembly 100 of the present invention, operatively connected to the illustrated implement tool bar 110, provides the agricultural implement with furrow-forming features not heretofore achievable with conventional agricultural machinery.

The first embodiment of the present invention is the hoe-opener assembly 100 comprising a framework which is in the form of an elongated stabilizer bar 112, extending rearwardly of tool bar 110 and movably connected thereto by two spaced-apart pairs of pivotal linkage members or elongated links 114 (FIGS. 1 and 2).

The pivotal links 114 form a parallelogram linkage; and this enables the stabilizer bar 112 to advantageously function as follows. The stabilizer bar 112 is initially disposed substantially horizontally relative to the ground G; and in view of the parallel configuration of the links 114, the stabilizer bar 112 is generally free to move substantially vertically relative to tool bar 110 whenever a hoe opener is met with rock or a like obstruction, all the while generally maintaining its substantially parallel relation to the ground G.

In operation, stabilizer bar 112 is thus free to "float" upwardly from its normal or furrow-forming "working" position to a "raised" position to avoid damage to the opener meeting the obstruction; and after the opener clears the obstruction, stabilizer bar 112 is automatically lowered, substantially parallel with the ground, back to the working position.

The present assembly 100 includes a spaced-apart pair of biasing-spring means 115, operatively connected to tool bar 110 and stabilizer bar 112, which create a down-force on the stabilizer bar 112.

Yet another feature of the present assembly 100 is that certain mechanical components thereof provide the stabilizer bar 112 with a "torsional resistance" feature, relative to tool bar 110. In particular, hoe-opener assembly 100 includes a vertically spaced-apart pair of elongated stiffeners 116, the respective end portions of each of which are fixed to a respective pair of the two pairs of links 114. That is, considering upper stiffener 116 (FIGS. 1 and 2), for example, the opposite end portions of the upper elongated stiffener 116 are fixed to respective spaced-apart ones of the upper pair of links 114. Lower elongated stiffener 116 is similarly fixed to the lower pair of links 114; and lower stiffener 116 is preferably disposed parallel to upper stiffener 116.

This manner of fixing the stiffeners 116 to the links 114 provides the elongated stabilizer bar 112 with its torsional resistance feature. That is, the upper surface 113 of stabilizer bar 112 is maintained substantially parallel to the upper surface 111 of tool bar 110 (FIGS. 1 and 2). Typically, tool bar 110, shown as fragmented in FIG. 1, is often relatively wide, is generally fixedly connected to an agricultural implement (not shown) which is typically relatively heavy, and is commonly supported by at least two spaced-apart ground-contacting wheels (also not shown).

In conventional furrow-forming agricultural equipment, however, there exists a tendency for the conventional hoe-opener assembly portion thereof to "twist" i.e. rotate about the longitudinal axis of the elongated framework member extending rearwardly from the tool bar when one of its hoe openers meets an obstruction, resulting in non-uniform furrow formation which is undesirable.

The present hoe-opener assembly 100 further comprises a ground-contacting gauge wheel 118, rotatably carried by stabilizer bar 112 in distal relation to tool bar 110, and a plurality of spring-biased hoe openers 120 pivotally mounted on stabilizer bar 112. Each hoe opener 120 is generally elongated, is substantially hollow along the length thereof, is substantially vertically disposed relative to stabilizer bar 112, and includes a feed tube 119 located at the upper portion thereof for receiving seed, grain, fertilizer or the like.

In operation, seed or grain introduced into any one feed tube 119 is guided by the structure of the associated hoe opener 120 as such seed or grain passes therethrough and is deposited into furrow F, formed by hoe-opener toe 121. (The operation of hoe-opener toe 121 is described in somewhat greater detail below.)

The plural hoe openers 120 are each pivotally carried by the stabilizer bar 112 at spaced-apart intervals along the length of the bar. Specifically, three hoe openers 120 are shown (FIGS. 1 and 2) mounted on stabilizer bar 112 in a spaced-apart manner along the length thereof. More particularly, each one of the three hoe openers 120 is spaced-apart from the other two openers 120 at locations that are not only longitudinally spaced along the length of stabilizer bar 112, but also laterally spaced from each other relative to stabilizer bar 112 (FIG. 1).

In the hoe-opener assembly 100 of the first embodiment, each hoe-opener 120 is preferably provided with a respective elongated spring-biased press-wheel arm 122. Each such elongated press-wheel arm 122 is operatively connected at a first end portion thereof to its associated hoe opener 120, and has a ground-contacting furrow-closing press wheel 124 connected to the opposite end portion thereof. Each such press wheel 124 is spaced behind its associated hoe opener 120, in relation to tool bar 110.

The hoe-opener assembly 100 also includes a corresponding plurality of suitably-stiff spring means 126 such as compression springs (FIG. 2). Each such spring means 126 is operatively contained within cylindrical body 127 which, in turn, is pivotally connected to a respective one of the plural hoe openers 120 and to an associated one of the plural press-wheel arms 122, to urge the associated press wheel 124 into furrow-closing engagement with the soil and to assist, to a degree, in maintaining the substantially vertical orientation of the associated hoe opener 120 relative to the generally horizontally-disposed stabilizer bar 112. The relative stiffness, or weakness, of each such spring means 126 is of course a matter of design choice.

A trailing end portion of stabilizer bar 112, that is in distal relation to tool bar 110, defines a substantially vertically-disposed, sleeved opening 128 (FIG. 1). The hoe-opener assembly 100 further includes an elongated gauge-wheel arm 130 having the gauge wheel 118 rotatably mounted on one end portion thereof, and having the opposite end portion thereof slidably disposed within sleeved opening 128 (FIG. 2).

A jackscrew 132 is rotatably connected to the gauge-wheel arm 130 and is threadably joined to stabilizer bar 112 for varying the spacing between stabilizer bar 112 and gauge wheel 118 for accordingly varying the spacing between stabilizer bar 112 and the ground G. Adjustment is commonly effected by utilizing jackscrew 132 to change the above-mentioned spacings for accordingly varying the depth of penetration of the plural hoe openers 120 into the soil. Because the hoe-opener assembly 100 includes means for resisting twisting of stabilizer bar 112 along its longitudinal axis relative to tool bar 110, it can be appreciated that desired, substantially uniform furrow depth can readily be maintained by an agricultural-implement operator adjusting jackscrew 132 to dispose hoe-opener toes 121 a desired depth into the soil.

The plural hoe openers 120 are individually mounted on stabilizer bar 112 by spaced-apart support or mounting stub members 134, 135 and 136, all of which are longitudinally spaced-apart along the length of the elongated stabilizer bar 112 an disposed transverse thereto. Each stub member 134, 135 and 136 has a respective one of the hoe openers 120 removably mounted thereon by a spaced-apart pair of conventional, threaded U-bolt fastener means 138 (FIGS. 1 and 2). Each stub member 134, 135 and 136, moreover, is suitably so dimensioned as to be used to laterally space its associated hoe opener 120 from stabilizer bar 112 by a desired distance such that furrows of substantially equal spacings, as between adjacent ones, are caused to be formed when the hoe-opener toes 121 are urged into the soil. Each spaced-apart pair of threaded fastener means 138, furthermore, is utilized to adjustably mount a corresponding spaced-apart pair of angle pieces 140 therebetween (FIGS. 1 and 2) and onto each respective one of the plural stub supports 134, 135 and 136. This construction desirably allows for convenient adjustment of the lateral spacing of any one hoe opener 120 relative to the others.

Fixed to and extending rearwardly from each pair of spaced-apart angle pieces 140 (relative to tool bar 110) is an associated pair of spaced-apart mounting plates 142 that are sandwiched between the angle pieces 140 (FIG. 1) and which have a corresponding one of the plural hoe openers operatively sandwiched therebetween. Specifically, each one of the plural hoe openers 120 is pivotally connected to (FIG. 2) a respective one pair of the corresponding plural pairs of mounting plates 142 by an associated one of a plurality of pivot means 143.

A relatively stiff biasing-spring means 144 such as a compression spring, carried between each such pair of angle pieces 140 (FIG. 1), is held captive on a spring pin 145. Each spring pin 145 is pivotally connected to an associated one of the plural press-wheel arms 122 and to a respective associated one of the plural hoe openers 120, by pivotally connected first and second links 146 and 147 (FIG. 2), for biasing its associated hoe opener 120 into the ground G and for maintaining the substantially vertical orientation of its associated opener 120. relative to the substantially horizontally disposed stabilizer bar 112. By this arrangement, limited spring-biased pivotal movement of each hoe opener 120, relative to stabilizer bar 112, is achieved; and such movement is substantially less than that which is typically provided by conventional hoe-opener construction. Specifically, as briefly mentioned above, where a conventional hoe opener may be permitted by its associated components and/or structure to "trip" or pivot rearwardly by as much as 75 degrees or more, the present assembly 100 limits pivotal movement of each one of its openers 120 to an angle "A" (FIG. 2), which is preferably about 75 degrees.

Moreover, the links 146 and 147, together with the biasing-spring means 144, co-act to assist the above-mentioned spring means 126 captively held in cylindrical body 127 and operatively connecting each hoe opener 120 to its associated press-wheel arm 122, for further maintaining the substantially vertical disposition of each such hoe opener 120 relative to the substantially horizontally-disposed stabilizer bar 112. Selecting suitable spring means such as compression springs, tension springs and the like for maintaining a relatively rigid, a relatively flexible, or an intermediate degree of articulation or "tripping" characteristic at the juncture where hoe opener 120 is pivotally joined to stabilizer bar 112 is of course a matter of design choice.

Furthermore, deciding upon whether to utilize relatively stiff spring means or relatively weak spring means, at pivotal links 114, is also a matter of design choice, dictated by the kind or degree of vertical movement of stabilizer bar 112 relative to tool bar 110 that is desired for the "lift-assist" feature, briefly mentioned above and described in detail below.

In operation, the present invention exhibits significantly improved depth control, as compared to that achieved when using conventional hoe opener mechanisms. One reason that such a result is achieved is because furrow-forming operation of each hoe opener 120 is effectively coordinated with and tied into operation of not only the stabilizer bar 112 but also the remainder of the plural hoe openers 120 as well. As mentioned above, resultant vertical freedom-of-movement of an obstructed hoe opener is dependent upon the inertia of the hoe-opener assembly. It can therefore be appreciated that selecting hoe openers of suitable strength, frameworks of desired weight, linkages of appropriate length, and spring means of specified characteristic—all tending to effect the desired degree of articulation of the hoe-opener assembly relative to the tool bar—are a matter of design choice. Thus, in operation, movement of a hoe opener 120 along the illustrated direction of travel D.T. (FIG. 2) generally causes the hoe-opener toe 121 to form the above-mentioned furrows F in the soil.

The illustrated hoe openers 120, furthermore, have conventionally formed toes 121. That is, each toe 121 is configured in a well-known manner to cause that hoe opener 120 to be drawn into the soil as such hoe opener 120, disposed into the soil as described above and thus having soil forces acting thereupon, is moved generally horizontally relative to the ground G.

Yet, conventional hoe openers have a tendency toward being forced upwardly and out of the ground G whenever the toe-portion thereof makes contact with clay-like or otherwise relatively "hard" (i.e. generally non-tillable) soil conditions. In the present invention, however, the tendency of any one hoe opener 120 to be raised up out of the soil whenever a hard-soil condition or obstruction is met is counterbalanced or resisted not only by the relative inertia of the other hoe openers 120 but also by the inertia of stabilizing framework, such as illustrated stabilizer bar 112, as well.

Moreover, the movable mounting of the overall hoe-opener assembly relative to tool bar 110 at pivotal links 114 permits the above-mentioned "floating" action, and spring means 115 provides a "lift-assist" feature, whereby the entire assembly is allowed to move upwardly relative to tool bar 110, yet remain substantially parallel to the ground, in the event that an obstruction is encountered. Such an obstruction, of course, can result in damage to conventional assemblies, as mentioned above. However, the floating-action feature of the present invention tends to minimize damage, because (as mentioned above) appropriate design choices can readily be made whereby the inertia of the hoe-opener assembly causes the obstructed hoe opener (or openers) to continue forming furrows in a desired manner—whether in, e.g., moderately or substantially packed soil, generally hard soil or clay-like soil substantially without incurring damage. Moreover, other appropriate design choices can also readily be made so that the entire assembly is permitted to move relatively freely upwardly, i.e. to "float", relative to the ground without incurring damage whenever one hoe opener meets rock or another relatively substantial obstruction which might otherwise tend to cause damage to the thus-obstructed opener. Such damage can further be avoided by configuring each hoe opener for limited spring-opposed pivotal movement relative to the stabilizing framework.

As mentioned above, the present hoe-opener assembly is well suited for use in combination with farm implements having relatively wide tool bars. For example, the present invention is particularly well suited for use in combination with a wide, foldable, articulated tool bar such as that type disclosed in U.S. Pat. No. 4,496,004 to Frase et al.

In particular, it is contemplated that the present invention can be used in combination with articulated, foldable tool bars of about 20 to about 60 feet in length. That is, it is contemplated that the present invention can advantageously be used in combination with foldable tool bars, which when unfolded and disposed transverse to the direction of movement thereof, are "relatively wide." It can of course be appreciated that the actual number of hoe-opener assemblies that can be mounted on such a relatively wide tool bar can be quite numerous. It is further contemplated that about 10 to about 32 hoe-opener assemblies of the first embodiment can be mounted on such an elongated, articulated tool bar having a length of about 20 to about 60 feet. (The number of assemblies, relative to the length of the tool bar, is of course dependent upon the desired spacing between furrows.)

Moreover, it is alternatively contemplated that about 4 to about 12 of the hoe-opener assemblies of the second embodiment can be mounted onto the above-mentioned relatively wide, articulated, foldable tool bar having a length of about 20 to about 60 feet. For the second embodiment, the manner of mounting the hoe-opener assembly onto the tool bar, including advantages thereof, is described below.

Yet, the present hoe-opener assembly can also be mounted on substantially rigid tool bars of one-piece construction as well. As a practical matter, however, the minimal length of such a rigid tool bar is about 8 feet, although it will be understood that the present invention can of course be mounted on even shorter tool bars, if desired.

The second embodiment of the present invention will now briefly be discussed.

Hoe-opener assembly 200, also configured to be drawn behind the tool bar 210 of an agricultural implement (not shown), comprises a framework in the form of a horizontally-disposed lattice 212 extending rearwardly of tool bar 210, link means (described in greater detail below) operatively connecting the lattice 212 to tool bar 210, a plurality of hoe openers 220 mounted on the lattice 212 in spaced-apart relation to each other, biasing-spring means (also described in greater detail below) associated with each hoe opener and limiting substantial pivotal movement of its associated opener relative to the lattice, a corresponding plurality of furrow-closing press wheels 224, and an elongated jackscrew 232 or like mechanism for raising or lowering the lattice 212 relative to the ground G.

The above-mentioned link means, together with certain other structural components, all described in greater detail below, allow the lattice 212 to "float" vertically relative to the tool bar 210, which is a feature mentioned and described above in connection with the first embodiment. The second embodiment, however, further includes additional structural components (also described in greater detail below) enabling one portion of hoe-opener assembly 200 to be arcuately movable in the vertical direction relative to another portion of hoe-opener assembly 200, which enhances the above-described "float" feature of the present invention.

The plural hoe openers 220 are utilized to form a corresponding plurality of spaced-apart furrows F. Each hoe opener 220 includes means pivotally connecting it to lattice 212, and relatively stiff biasing-spring means 244 such as a compression spring configured to oppose substantial pivotal movement of such hoe opener 220 relative to lattice 212. In particular, each hoe opener 220 is substantially fixed against independent movement relative to lattice 212, as is described above in connection with the first embodiment.

The jackscrew 232, operatively connected to lattice 212, is utilized for adjusting the depth of penetration of the plural hoe openers 220 into the soil, as will be described in greater detail below.

Also, as will be evident, the second embodiment is configured such that the plural furrow-closing press wheels 224 function in the nature of the above-described gauge wheel 118 of the first embodiment (FIGS. 1 and 2). That is, the plural press wheels 224 provide the desired vertical spacing of lattice 212 above the ground G.

Thus, another advantage of the second embodiment over conventional hoe-opener assemblies is that fewer total parts may be required to form a given number of furrows because some of the component parts of the second embodiment perform a dual function. For example, the second embodiment, although utilizing press wheels, does not utilize the type of press-wheel arm that is discussed above in connection with the first embodiment. Instead, the second embodiment utilizes structure which functions not only as a gauge-wheel arm but also as a press-wheel arm as well. The result of such an advantage may reduce production cost of the hoe-opener assembly, which is of course an economically desirable consideration.

As in the first embodiment, the hoe-opener assembly 200 of the second embodiment is pivotally connected to, and rearwardly spaced behind, the elongated tool bar 210. In particular, an elongated upper link 250 and a spaced-apart pair of elongated lower links 252 and 254 pivotally connect lattice 212 to tool bar 210. One end portion of elongated upper link 250 is sandwiched between and pivotally joined to a spaced-apart pair of mounting plates 260 affixed to tool bar 210, and the opposite end portion of elongated upper link 250 is similarly sandwiched between and pivotally joined to a second spaced-apart pair of mounting plates 262 that are fixed to lattice 212.

The above-mentioned elongated lower link which is identified by reference numeral 252 and which is located in the foreground in FIGS. 3 and 4 as well as the other above-mentioned elongated lower link 254 that is located in the background are each pivotally joined to lattice 212 at respective first end portions of each of links 252 and 254 by respective pairs of spaced-apart mounting plates 264 that are fixed to lattice 212. The opposite end portions of each of lower links 252 and 254 are pivotally connected to tool bar 210 in a manner described as follows. Specifically, the background lower link 254 includes an integral angled stiffener piece 255, pinned to tool bar 210 and lattice 212, to counteract any tendency of lattice 212 to move transverse to tool bar 210 when both are moved together along the ground G in the illustrated direction of travel D.T. (FIGS. 3 and 4) or whenever both are brought through a turn.

However, it has been found that a certain amount of radial articulation is desirable. "Radial articulation" as herein defined means that degree of flexure which is permitted at connected elements of the hoe-opener assembly 200 as the assembly 200 is brought through a turn as it moves over the ground. Accordingly, hoe-opener assembly 200 is provided with a multiplicity of suitable ball-and-socket joints 266 to provide substantially that degree of radial articulation which is desired. One such ball-and-socket joint 266 is shown (FIG. 3) sandwiched between and pivotally joined to a spaced-apart pair of mounting plates 268 that are fixed to tool bar 210. (The remainder of the ball-and-socket joints 266 can be viewed upon reference to FIG. 3.)

Biasing-spring means 270, operatively connected between upper link 250 and associated mounting plates 260, assists in the vertical (i.e. "floating") movement of lattice 212 relative to tool bar 210. As mentioned above, tool bar 210 is spaced a desired distance above the ground G by structure (not shown), such spacing often being adjustable by the agricultural-implement operator. Preferably, tool bar 210 is spaced at least about 22 inches above the ground G to allow the tool bar 210 to clear any "field trash" that may be present. Generally, a greater clearance will improve flow of trash residue. As used herein, the term "field trash" includes weeds and any crop residue remaining in the field after harvesting crops. Depending upon the density and quantity, such field trash can constitute yet another kind or type of hoe-opener obstruction. The presence of a mechanical stop 272, fixed to tool bar 210, causes the lowering of lattice 212 relative to tool bar 210 to be directly related to the selected spacing of the tool bar 210 above the ground G. In particular, after lower link 252 abuttingly engages mechanical stop 272 (FIG. 3), the plural hoe opener toes 221 can be lowered no further into the soil.

The forward portion of lattice 212 (i.e. that portion which is in proximate relation to tool bar 210) includes two pairs of spaced-apart, elongated, rearwardly-extending members 274 and 275. Members 274 are spaced relatively further from the central portion of the hoe-opener assembly 200, but relatively closer to tool bar 210, than are members 275. Yet, both member pairs 274 and 275 straddle this central portion (FIG. 3).

The lattice 212 further includes a suitable number of additional elongated spaced-apart members 276 disposed transverse to elongated member pairs 274 and 275 and fixed either to that pair of spaced-apart members 275 that are closer to the lattice central portion (i.e. the "inner pair"), that pair of spaced-apart members 274 that are relatively further from the lattice central portion (i.e. the "outer pair"), or to both.

The hoe-opener assembly 200 further comprises a latticed press-wheel support frame 278, pivotally joined to the inner pair of longitudinally-extending members 275. In particular, the press-wheel support frame 278 is pivotally joined to members 275 by a spaced-apart pair of pillow-block bearings 280, removably affixed to respective ones of the member pair 275.

The press-wheel support frame 278, in turn, comprises a spaced-apart pair of elongated members 279 disposed rearwardly relative to tool bar 210, an elongated cylindrical rocker shaft 282 rotatably carried by bearings 280, and a pair of press-wheel mounting plates 284 that are spaced from each other and from rocker shaft 282. The spaced-apart pair of mounting plates 284 together carry an elongated axle 288 onto which the plural press wheels 224 are rotatably mounted. The opposite ends of elongated rocker shaft 282 are fixed to respective ones of the rearwardly disposed elongated members 279 for providing torsional strength to press-wheel support frame 278.

The mounting plates 284, in turn, are fixed to respective ones of the rearwardly extending members 279, in distal relation to rocker shaft 282 (FIG. 4). The plural press wheels 224, rotatably carried by mounting plates 284 as mentioned above, are thus located on the press-wheel support frame 278 in distal relation to rocker shaft 282. The plural press wheels 224, moreover, are each so adjustably mounted on press wheel axle 288 as to be movable substantially along the length of axle 288, to align any one press wheel 224 with its corresponding one hoe opener 220 for closing a specific furrow F (FIG. 3).

The lattice 212 further comprises an elongated depth-control member 286, horizontally disposed and sandwiched between the spaced-apart pair of inner members 275 which straddle the central portion of hoe-opener assembly 200 (FIG. 3). Depth-control member 286, fixed to the two of the plural transversely-extending members 276 which are distally located from tool bar 210 (FIG. 4), extends rearwardly from tool bar 210 and from inner members 275. One end portion of depth-control member 286, which is in distal relation to tool bar 210, threadably carries a threaded portion of jackscrew 232, while the press-wheel support frame 278 rotatably carries another threaded portion of jackscrew 232. Rotation of jackscrew 232 about its longitudinal axis thus causes depth-control member 286 and press-wheel support frame 278 to arcuately move relative to each other along an arc scribed from rocker shaft 282. Adjustment of jackscrew 232, by e.g. the agricultural-implement operator, thus causes the press-wheel support frame 278 to flex (i.e. arcuately move) vertically relative to lattice 212.

In the illustrated embodiment, 6 hoe-openers 220 are shown pivotally mounted on lattice 212 (FIG. 3) and a like number of the ground-contacting press wheels 224 are shown rotatably carried by mounting plates 284 at suitable locations on axle 288. As will be appreciated, a different number of hoe openers, and a like number of ground-contacting wheels, can be employed. However, as mentioned above, the spacing between adjacent furrows is determined by crop considerations such as type of crop grown, expected amount of plant growth, type of growing soil and the like. Thus, the number of press wheels 224 mounted on hoe-opener assembly 200 can vary from the illustrated number of 6, based in part upon crop considerations and the desired width of assembly 200. Yet, because it is desirable that substantially all of the plural press wheels of this embodiment be in contact with the ground at all times, it has been found that the maximum width of hoe-opener assembly 200 is preferably about $5\frac{1}{2}$ to about 6 feet, based upon average field elevational variations. Of course, certain agricultural areas—such as those areas where field elevational variations are less pronounced than average—may be able to utilize hoe-opener assemblies having widths of more than about 6 feet, while realizing many, if not all, of the features and advantages described herein.

One such feature or advantage is that when substantially all of the plural press wheels 224 are in contact with the ground G, the ground-contacting plural press wheels 224 tend to control the radial orientation of hoe-opener assembly 200 and particularly the framework element constituted by lattice 212. Such ground contact advantageously further enhances the degree of uniform depth control otherwise achieved. In conventional hoe-opener assemblies, on the other hand, radial orientation is generally controlled by the tool bar.

Other features or advantages of the present invention can briefly be highlighted as follows. Where the first hoe-opener assembly 100 is provided with substantial torsional resistance to achieve desired uniform depth control, the second hoe-opener assembly 200 is provided with somewhat different features to achieve the same result. In the second embodiment, for example, because the press wheels 224 are substantially always in contact with the ground and because the second assembly 200 includes the above-mentioned ball-and-socket joints 266, field unevenness may in fact cause the hoe-opener assembly 200 to torsionally flex (i.e. the lattice may twist along the hoe-opener assembly longitudinal axis) relative to tool bar 210, whereby the second assembly 200 is able to achieve substantially uniform depth control.

What has been illustrated and described herein is a novel hoe-opener assembly. While the hoe-opener assembly of the present invention has been illustrated and described with reference to preferred embodiments, the present invention is not limited thereto. On the contrary, alternatives, changes or modifications will become apparent to those skilled in the art upon reading the foregoing description. That is, many of the above-discussed design features of the present soil-opener assembly allow crop-planting modifications to be made—such as substituting a disc-type soil opener for each hoe opener—whereby the thus-modified assembly is able to achieve substantially the desired, uniform-depth control as is described above for the hoe-opener type of assembly. Accordingly, such alternatives, changes and modifications are to be considered as forming a part of the invention insofar as they fall within the spirit and scope of the appended claims.

What is claimed is:

1. A hoe-opener assembly configured to be drawn behind an agricultural implement having a tool bar, comprising:

a framework extending rearwardly of said tool bar;

parallelogram linkage means operatively connecting said framework to said tool bar and providing a movable connection therebetween, for allowing the framework to be raised and lowered relative to the ground while said framework is maintained in substantially parallel relation to the ground;

frame biasing means operatively connected to and extending between said tool bar and said framework for biasing the movement of said framework provided by said parallelogram linkage means relative to said tool bar;

a plurality of hoe-openers mounted on said framework in spaced-apart relation to each other for forming a corresponding plurality of spaced-apart furrows, each one of said plural hoe-openers including means pivotally connecting said one hoe-opener to said framework, with associated biasing-spring means provided configured to oppose substantial pivotal movement of said one hoe-opener relative to said framework, the biasing-spring means substantially fixing its associated hoe-opener against independent movement relative to said framework;

ground-contacting wheeled means for spacing the framework a preselected distance above the ground; and jackscrew means adjustably connected to said framework and to said ground-contacting wheeled means for adjusting the depth of penetration of said plural hoe-openers into the ground.

2. The hoe-opener assembly in accordance with claim 1, wherein said framework is an elongated stabilizer bar having a longitudinal axis extending rearwardly of said tool bar, and wherein the parallelogram linkage means comprises a pair of laterally spaced upper links and a pair of laterally spaced lower links extending between the tool bar and the stabilizer bar, said assembly including stiffener means extending between said upper links and between said lower links for resisting rotation of the stabilizer bar about its longitudinal axis relative to the tool bar.

3. The hoe-opener assembly in accordance with claim 1, wherein said biasing-spring means comprises a compression spring means held captively on spring pin means, said spring pin means being operatively connected to the respective one of said pivotal hoe openers.

4. The hoe-opener assembly in accordance with claim 1, including a plurality of press wheel means that corresponds in number to the number of plural hoe openers, each one of said plurality of press wheels being respectively pivotally connected to and trailing the corresponding one of said plural hoe openers for closing substantially each one of the corresponding plurality of spaced-apart furrows formed by said plurality of hoe openers.

5. The hoe-opener assembly in accordance with claim 1 wherein the ground-contacting wheeled means comprises a plurality of laterally-spaced ground-contacting press wheels mounted on said framework such that each said press wheel is substantially longitudinally aligned with a corresponding respective one of said plurality of hoe openers for substantially closing each said one of the plural furrows formed thereby.

6. A hoe-opener assembly configured to be drawn behind an agricultural implement having a tool bar, comprising:

a framework extending rearwardly of said tool bar;

link means operatively connecting said framework to said tool bar and providing a movable connection therebetween, for allowing the framework to be raised and lowered relative to the ground;

a plurality of hoe-openers mounted on said framework in spaced-apart relation to each other for forming a corresponding plurality of spaced-apart furrows, each one of said plural hoe-openers including means pivotally connecting said one hoe-opener to said framework, with associated biasing-spring means provided configured to oppose substantial pivotal movement of said one hoe-opener relative to said framework, the biasing-spring means substantially fixing its associated hoe-opener against independent movement relative to said framework;

ground-contacting wheeled means for spacing the framework a preselected distance above the ground, said wheeled means comprising a plurality of laterally-spaced ground-contacting press wheels mounted on said framework such that each said press wheel is substantially longitudinally allighned with a corresponding respective one of said plurality of hoe-openers for substantially closing each said one of the plural furrows formed therebetween;

jackscrew means adjustably connected to said framework for adjusting the depth of penetration of said plural hoe-openers into the ground;

wherein the wheeled means further comprises a press-wheel support means pivotally joined to said framework and extending rearwardly therefrom, and said hoe-opener assembly has a longitudinal axis extending rearwardly of said tool bar, said framework comprising a horizontally-disposed lattice extending rearwardly of said tool bar and centered substantially along said hoe-opener assembly longitudinal axis, said lattice and said tool bar together carrying a multiplicity of ball-and-socket joint means for allowing the lattice to twist about said hoe-opener assembly longitudinal axis relative to said tool bar for accordingly allowing substantially all of said press wheels to remain in contact with the ground.

* * * * *